US011943578B2

(12) United States Patent
Dyreby

(10) Patent No.: US 11,943,578 B2
(45) Date of Patent: Mar. 26, 2024

(54) LOUDSPEAKER ENCLOSURE WITH CLOSEABLE PORT

(71) Applicant: Bang & Olufsen A/S, Struer (DK)

(72) Inventor: Jakob Dyreby, Struer (DK)

(73) Assignee: Bang & Olufsen A/S, Struer (DK)

( * ) Notice: Subject to any disclaimer, the term of this patent is extended or adjusted under 35 U.S.C. 154(b) by 946 days.

(21) Appl. No.: 16/467,908

(22) PCT Filed: Dec. 8, 2017

(86) PCT No.: PCT/DK2017/000022

§ 371 (c)(1),
(2) Date: Jun. 7, 2019

(87) PCT Pub. No.: WO2018/103798

PCT Pub. Date: Jun. 14, 2018

(65) Prior Publication Data

US 2019/0320257 A1 Oct. 17, 2019

(30) Foreign Application Priority Data

Dec. 9, 2016 (DK) ........................... PA 2016 00752
Feb. 2, 2017 (DK) ........................... PA 2017 00065

(51) Int. Cl.
*H04R 1/28* (2006.01)
*H04R 1/02* (2006.01)

(52) U.S. Cl.
CPC ............. *H04R 1/2826* (2013.01); *H04R 1/02* (2013.01); *H04R 1/2892* (2013.01)

(58) Field of Classification Search
CPC .. H04R 1/2819; H04R 1/2826; H04R 1/2834; H04R 1/2857; H04R 1/2865;
(Continued)

(56) References Cited

U.S. PATENT DOCUMENTS 9,615,163 B1 * 4/2017 Nachman ............. H04R 1/2826
2005/0105755 A1 5/2005 Yueh
(Continued)

FOREIGN PATENT DOCUMENTS

JP 2009/152769 A 7/2009
JP 2009152769 A * 7/2009 ............... H04R 1/28
(Continued)

*Primary Examiner* — Ahmad F. Matar
*Assistant Examiner* — Sabrina Diaz
(74) *Attorney, Agent, or Firm* — Neal, Gerber & Eisenberg LLP; Thomas E. Williams

(57) ABSTRACT

A loudspeaker device comprising a loudspeaker unit comprising a diaphragm with a first and second surface (such as the front and rear surface of the diaphragm, respectively) and an enclosure in which the loudspeaker unit is mounted such that the first surface of the diaphragm is in acoustic communication with the surroundings of the loudspeaker device. The device further comprises an internal cavity formed in the enclosure and being in acoustic communication with the surroundings of the loudspeaker device via an acoustic element. In the device, the second surface of the diaphragm is in acoustic communication with the internal cavity. The acoustic element can be varied between a state in which sound energy generated by the loudspeaker unit in the internal cavity can be emitted to the surroundings via the acoustic element and a state in which sound energy is substantially prevented from entering the surroundings via the acoustic element.

19 Claims, 9 Drawing Sheets

(58) Field of Classification Search
CPC .......... H04R 1/025; H04R 1/08; H04R 1/403; H04R 1/02; H04R 1/028; H04R 1/12; H04R 1/22; H04R 1/345; H04R 1/2842; H04R 1/026; H04R 1/021; H04R 1/06; H04R 1/2892; H04R 2201/021; H04R 5/02; H04R 2205/021; H04R 2499/11; H04R 31/006; H04R 7/16; H04R 13/02; B60R 11/0217; B60R 2011/0045; H04S 7/40; A63J 17/00; G10K 9/13
USPC ......... 381/87, 332, 334, 150, 345, 386, 394; 181/156
See application file for complete search history.

(56) References Cited

U.S. PATENT DOCUMENTS

| | | | | |
|---|---|---|---|---|
| 2011/0026739 | A1* | 2/2011 | Thomsen | H03F 1/3211 381/174 |
| 2014/0341394 | A1* | 11/2014 | Croft, III | H04R 3/002 381/102 |

FOREIGN PATENT DOCUMENTS

| | | | | | |
|---|---|---|---|---|---|
| WO | 2006/043215 | A1 | | 4/2006 | |
| WO | 2016/098068 | A1 | | 6/2016 | |
| WO | WO-2016098068 | A1 | * | 6/2016 | H04R 1/28 |

* cited by examiner (d)

(e)

LOUDSPEAKER ENCLOSURE WITH CLOSEABLE PORT

This application is a U.S. National Phase application under 35 U.S.C. 371 that claims priority to PCT Application Number PCT/DK2017/000022, filed on Dec. 8, 2017, which claims priority of both DK Application Number PA 2016 00752, filed on Dec. 9, 2016, and DK Application Number PA 2017 00065, filed on Feb. 2, 2017, which are all incorporated herein by reference in their entirety.

TECHNICAL FIELD

The present invention relates generally to the field of loudspeakers and loudspeaker enclosures and more specifically to means for providing extended low frequency response and low distortion acoustic output at low frequencies of loudspeakers mounted in loudspeaker enclosures both at high and low sound pressure levels.

BACKGROUND OF THE INVENTION

The frequency response of a loudspeaker mounted in an enclosure will roll off at low frequencies below a lower cut off frequency that is determined by the electro-acoustical parameters of the loudspeaker and the size and type of the enclosure in which the loudspeaker is mounted. The low frequency response of an active loudspeaker (i.e. a loudspeaker provided with its own dedicated amplifier comprising a power amplifier) is often equalized to compensate for the acoustic low frequency roll off of the loudspeaker. Further, it is possible to extend the low frequency roll off to lower frequencies by the introduction of a boost at low frequencies. However, to extend the sound pressure to half the frequency, the diaphragm excursion of the loudspeaker driver has to be four times as large.

As long as the level of the signal is relatively low, equalization does not introduce problems. However, at higher signal levels the required diaphragm excursion will become larger than what the driver can handle and consequently non-linear distortion of the acoustic signal emitted by the loudspeaker is introduced and in this case, it is essential to reduce the signal level to avoid audible distortion and damaging the driver. This will introduce a limit to the sound pressure level that the driver is able to produce. Here and in the following the term “driver” is equivalent to such terms as “loudspeaker” and “loudspeaker driver”.

In order to obtain increased bass response in a limited frequency region it is known to introduce a port in the loudspeaker enclosure in order to decrease the excursion of the driver diaphragm. A port in an enclosure acts as a Helmholtz resonator with a resonance frequency. At frequencies that are much lower than the resonance frequency the air volume displacement generated by the driver is exiting directly out of the port. Therefore, the air volume displacement of the port is out of phase with the air volume displacement of the driver. Consequently, the resulting sound pressure is lower than if there was no port and the driver will have to move extensively to generate sound.

At frequencies that are much higher than the resonance frequency the ported system will act as a closed box because the mass of the air in the port is too heavy to get excited. At the resonance frequency, the pressure inside the cabinet will build up because of the resonance. This pressure build-up will limit the excursion of the driver diaphragm and the primary source of sound pressure will be the port. An analogy is a string where a small movement in one end will cause the middle of the string to move much more at the resonance frequency.

It would be advantageous to have access to a loudspeaker device, i.e. one or more low frequency loudspeakers mounted in an enclosure (often termed a box or a cabinet) that would provide the best possible low frequency sound reproduction both at low and high sound pressure levels without thereby exceeding the maximal allowable diaphragm excursion of the loudspeaker(s) used in the device.

OBJECTS OF THE INVENTION

On the above background, it is an object of the present invention to provide a loudspeaker device with optimum low frequency response both at low sound pressure levels generated by the loudspeaker device and at high sound pressure levels generated by the loudspeaker device.

In the present context, the term “loudspeaker device” means the combination of a loudspeaker unit (also called loudspeaker driver or loudspeaker transducer, but often referred to simply as a loudspeaker) and an enclosure (often referred to as a loudspeaker box or cabinet) in which the loudspeaker unit is mounted.

DISCLOSURE OF THE INVENTION

The above and further objects and advantages are according to a first aspect of the invention obtained by the provision of a loudspeaker device which is configured such that it can be changed to obtain the advantage of the closed box at low sound pressure levels (SPL) and the advantage of the ported box at high SPL.

FIG. 1 shows as an illustrative example, the diaphragm excursion of a 10-inch loudspeaker driver required to produce 88 dB sound pressure level (SPL) at a distance of 1 metre in a closed and a ported box. The internal volumes of the boxes are the same.

As it appears from FIG. 1, the port relieves the driver above 32 Hz i.e. in the frequency region indicated by reference numeral 3 in the figure. Below the port resonance, the port and driver have opposite polarities which increases the strain on the driver. Consequently, the ported system requires bigger diaphragm excursion than the closed system below 32 Hz. At frequencies above 100 Hz the diaphragm excursions of the two systems will coincide. It is of interest to have a flat frequency response at all levels.

The 10-inch loudspeaker driver used in this example has a diaphragm excursion limit of 6 mm.

FIG. 2 shows the obtainable frequency responses of the closed and ported system, respectively at a level of 94 dB SPL when the diaphragm excursion is limited to 6 mm to avoid distortion.

As it appears from FIG. 2, the closed system is performing better or equal than the ported system at all frequencies. At this level, the closed system is preferable.

FIG. 3 shows the obtainable frequency responses at 104 dB SPL and with the same diaphragm excursion limit of 6 mm. At this level, the ported system performs best between 32 Hz and 57 Hz whereas the closed system is better below 32 Hz. At this level, it is questionable which system will be preferable.

FIG. 4 shows the obtainable frequency responses at 114 dB SPL and with the same diaphragm excursion limit of 6 mm.

In order to obtain a controlled bass response both when the acoustic system is ported and closed the bass response is equalized.

FIG. 5 shows the acoustic response of the closed system before and after equalization along with the equalization filter.

FIG. 6 shows the acoustic response of the ported system before and after equalization along with the equalization filter. It should be noted that the acoustic response with equalization has a higher roll off frequency and a steeper roll off. As a consequence, the equalization filter has a smaller boost.

According to the first aspect of the invention there is thus provided A loudspeaker device comprising:

a loudspeaker unit comprising a diaphragm with a first and second surface (such as the front and rear surface of the diaphragm, respectively) and an enclosure in which the loudspeaker unit is mounted such that the first surface of the diaphragm is in acoustic communication with the surroundings of the loudspeaker device;

an internal cavity formed in the enclosure and being in acoustic communication with the surroundings of the loudspeaker device via an acoustic element;

where the second surface of the diaphragm is in acoustic communication with the internal cavity;

wherein the acoustic element can be varied between a state in which sound energy generated by the loudspeaker unit in the internal cavity can be emitted to the surroundings via the acoustic element and a state in which sound energy is substantially prevented from entering the surroundings via the acoustic element;

wherein the loudspeaker device comprises amplifier means configured to drive the loudspeaker unit, which amplifier means are provided with a volume control by which the acoustic output of the loudspeaker device can be varied by a user, and where adjustment of the volume control controls the acoustic element, such that the volume control controls whether the acoustic element is in an open or closed state, i.e. whether acoustic energy is emitted to the surroundings through the acoustic element or not.

The state in which sound energy is substantially prevented from entering the surroundings via the acoustic element (and where the enclosure consequently functions as a closed box loudspeaker enclosure) is the situation in which the loudspeaker device is desired to generate a relatively low sound pressure level.

The state in which sound energy can be emitted to the surroundings via the acoustic element (and where the enclosure consequently functions as a bass reflex loudspeaker enclosure) is the situation in which the loudspeaker device is desired to generate a relatively high sound pressure level.

In an embodiment of the first aspect, the acoustic element is a channel provided with blocking means configured to block acoustic communication through the channel when the loudspeaker device is in a state in which sound energy is substantially prevented from entering the surroundings via the acoustic element.

In an embodiment of the first aspect, sound transmission through the channel is prevented or at least reduced by using a material like rock wool which introduces acoustic resistance in the channel.

Various mechanisms configured to open/close the acoustic element are described in the detailed description of the invention. It is stressed, however that the described mechanisms are only non-limiting examples of such mechanisms and that other mechanisms that can open/close the sound transmission through the acoustic element may be conceived. The opening/closing mechanism may be driven by a variety of actuating means, such as servo motors, electromagnetic coils, etc.

In an embodiment of the first aspect, the loudspeaker device comprises signal processing means whereby the change in acoustic response of the loudspeaker device is accompanied by a corresponding change in the signal processing feeding the amplifier of the driver. The signal processing change will be comprised by different equalizations and protection limiter settings.

In an embodiment of the first aspect, the variation of the acoustic element is controlled by a user interface.

In an embodiment of the first aspect, the loudspeaker device comprises amplifier means configured to drive the loudspeaker unit and is provided with a volume control by which the acoustic output of the loudspeaker device can be varied by a user, and where the adjustment of the volume control controls whether the acoustic element should be in an open or closed state, i.e. whether acoustic energy should be emitted to the surroundings through the channel (port). The adjustment of the volume control thus in this embodiment controls the activation of sound emission from the channel (port) to the surroundings. The activation and deactivation of sound emission through the channel (port) can be controlled with the volume control with or without hysteresis. With hysteresis, the setting of the volume control is increased to a setting S2 at which the channel (port) opens and when the volume control is reduced to a setting S1 below S2, the channel (port) closes again. S1 equal to S2 is the option in which activation and deactivation takes place without hysteresis.

In an embodiment of the first aspect, the internal cavity and said acoustic element forms a Helmholtz resonator, whereby the loudspeaker device, in the open state of the acoustic element, functions as a bass reflex loudspeaker.

In an embodiment of the first aspect, the acoustic element is a passive sound radiator (slave loudspeaker).

In an embodiment of the first aspect, the acoustic element is provided with blocking means configured substantially to prevent the diaphragm of the passive sound radiator (slave loudspeaker) to undergo displacements, whereby the passive radiator becomes prevented from emitting sound energy to the surroundings.

In embodiment of the first aspect, the loudspeaker device comprises more than one channel (port) which can be blocked individually to obtain different port tunings. Thereby it becomes possible to cover different frequency ranges and/or different volume ranges and thereby increasing the number of ways in which the frequency response and maximum power output can be varied according to the principles of the invention.

In an embodiment of the first aspect, the channel or port has a variable length, whereby the tuning of the channel or port can be steplessly changed.

In an embodiment of the first aspect, the channel or port comprises two or more tubes provided slideably inside each other.

In an embodiment of the first aspect, the loudspeaker device is provided with digital signal processing (DSP) filter means that interacts with the opening/closing of the channel (port) such that for instance different filter adjustments can be applied to the input signal to the loudspeaker device dependent on whether the channel (port) is in its open or closed state.

In an embodiment of the first aspect, the opening/closing of the channel (the port configuration) is made dependent on user profiles and/or music styles.

In an embodiment of the first aspect, the opening/closing of the channel (the port configuration) is obtained automatically, for instance based on detection of the music by a suitable digital signal processor (DSP) or in connection with a change of signal source.

In an embodiment of the first aspect, the loudspeaker device is provided with means (such as a suitable DSP processor) comprising room compensation filter settings.

In an embodiment of the first aspect, the loudspeaker device is provided with means (such as a suitable DSP processor) configured to reduce low frequency content, e.g. reducing gain in the audio signal path at low frequencies, temporarily during transition from the open to the closed state of the channel (port) to avoid unwanted sound distortion during the transition period.

The above and further objects and advantages are according to a second aspect of the invention obtained by the provision of a method for improving the sound quality especially at low frequencies of a loudspeaker device, which method comprises:

- providing a loudspeaker device comprising a loudspeaker unit having a diaphragm with a first surface and a second surface, where the loudspeaker unit is mounted in an enclosure having an internal cavity such that the first surface of the diaphragm radiates sound energy into the surroundings of the enclosure and the second surface of the diaphragm radiates sound energy into the interior cavity of the enclosure, and where the interior cavity is acoustically connected to an opening in the enclosure such that sound energy can enter the surroundings of the enclosure through the opening, where the acoustic connection takes place through a channel or port in which an acoustic element is inserted configured such that the acoustic element can block or open the acoustic connection from the internal cavity to the surroundings;
- providing activating means configured to block or open said acoustic connection from the internal cavity to the surroundings;
- setting a threshold value that defines whether the activating means shall block or open the acoustic connection from the internal cavity to the surroundings;
- providing means for determining if said threshold value is exceeded;
- If the threshold value is not exceeded, place the acoustic connection in the blocked state;
- if the threshold value is exceeded, place the acoustic connection in the open state.

In an embodiment of the second aspect, said threshold value is related to the setting of a volume control that controls the sound volume (as for instance determined by the sound pressure level (SPL) produced by the loudspeaker device or the loudness produced by the loudspeaker device) such that the enclosure acts as a closed box at low SPL or loudness and such that the enclosure acts as an open (ported) box (such as a bass-reflex enclosure) at high SPL or loudness of the sound produced in the surroundings of the enclosure by the loudspeaker device.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION OF THE INVENTION

In the following a detailed description of an example embodiment of the invention is given. It is, however understood that the principles of the invention could be embodied in other ways.

Figure 1:
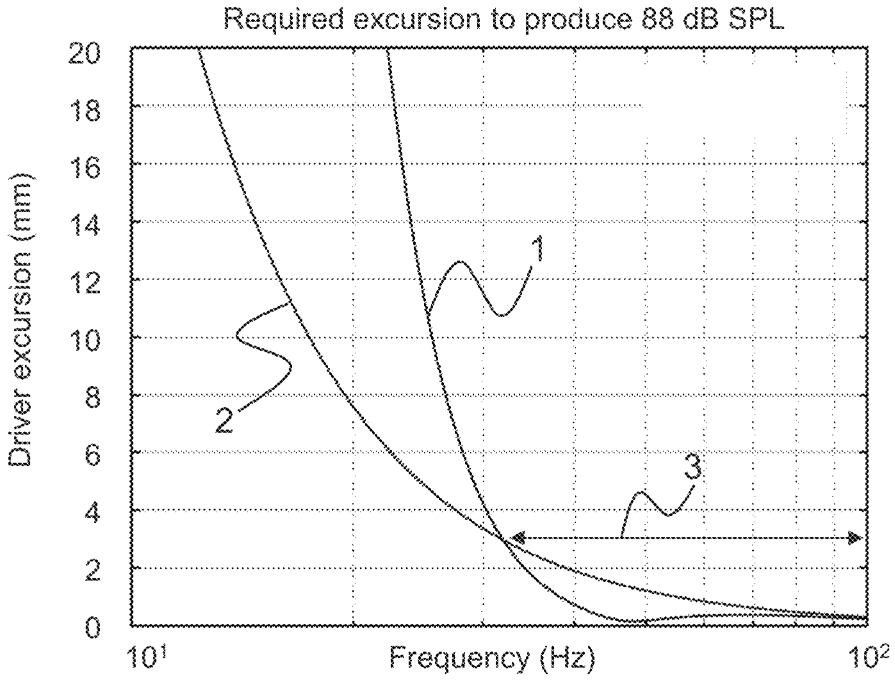
FIG. 1 shows a plot of loudspeaker driver diaphragm excursion as a function of frequency for a loudspeaker driver mounted in a closed box and a ported box, respectively, necessary for the given loudspeaker to generate a sound pressure level of 88 dB SPL at a distance of 1 metre from the loudspeaker box.

With reference to FIG. 1 there is shown a plot of loudspeaker driver diaphragm excursion as a function of frequency for a loudspeaker driver mounted in a closed box 2 and a ported box 1, respectively, necessary for the given loudspeaker to generate a sound pressure level of 88 dB SPL at a distance of 1 metre from the loudspeaker box.

Figure 2:
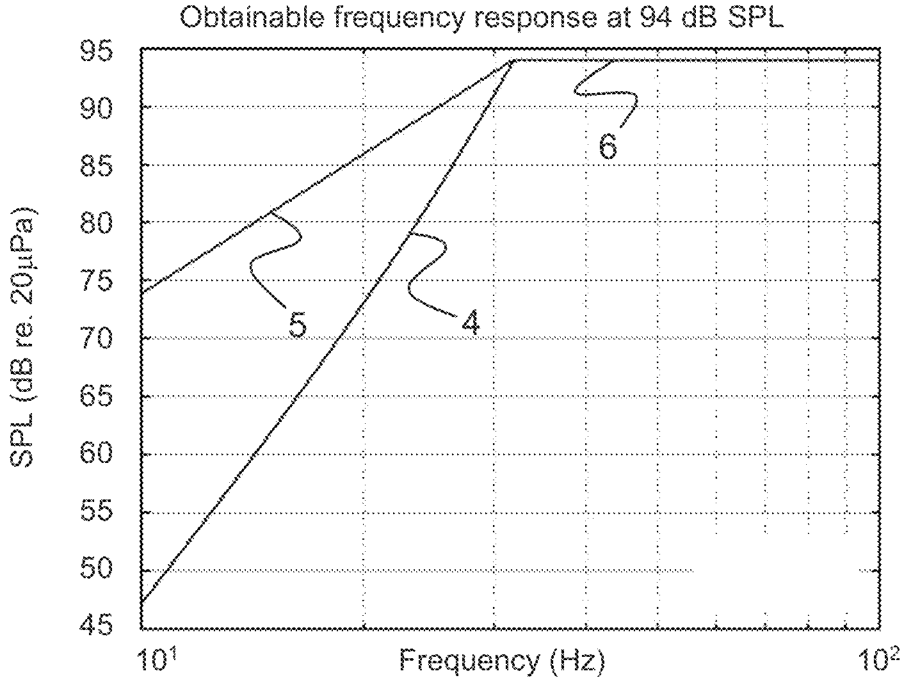
FIG. 2 shows a plot of obtainable frequency responses at a sound pressure level of 94 dB SPL for a loudspeaker driver mounted in a closed box and a ported box, respectively.

With reference to FIG. 2 there is shown a plot of obtainable frequency response at a sound pressure level of 94 dB SPL for a loudspeaker driver mounted in a closed box 5 and a ported box 4, respectively. and with a driver diaphragm excursion limit of 6 mm.

Figure 3:
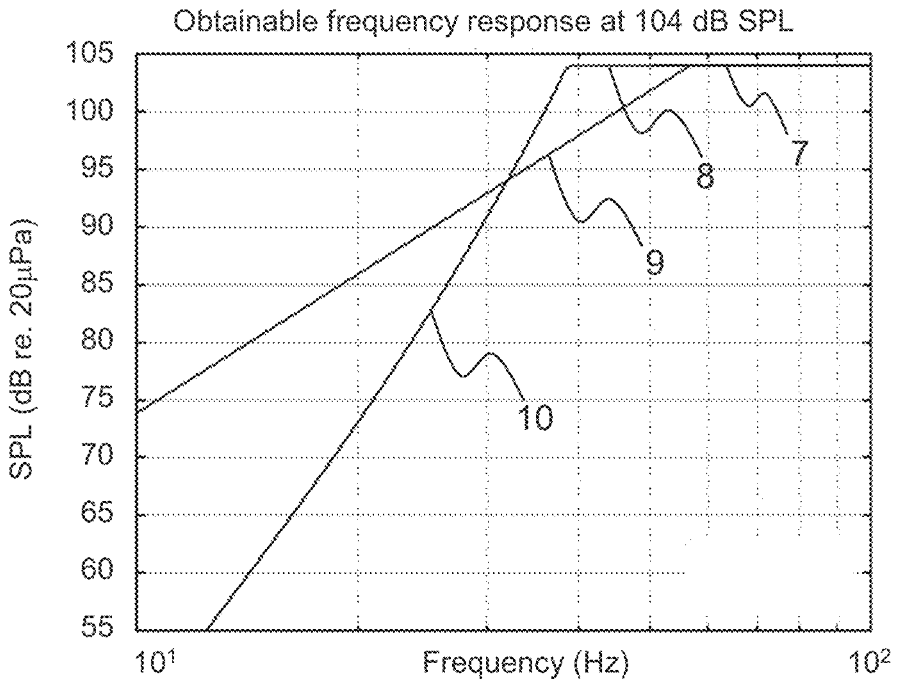
FIG. 3 shows a plot of obtainable frequency responses at a sound pressure level of 104 dB SPL for a loudspeaker driver mounted in a closed box and a ported box, respectively.

With reference to FIG. 3 there is shown a plot of obtainable frequency response at a sound pressure level of 104 dB SPL for a loudspeaker driver mounted in a closed box 9 and a ported box 10, respectively and with a driver diaphragm excursion limit of 6 mm.

Figure 4:
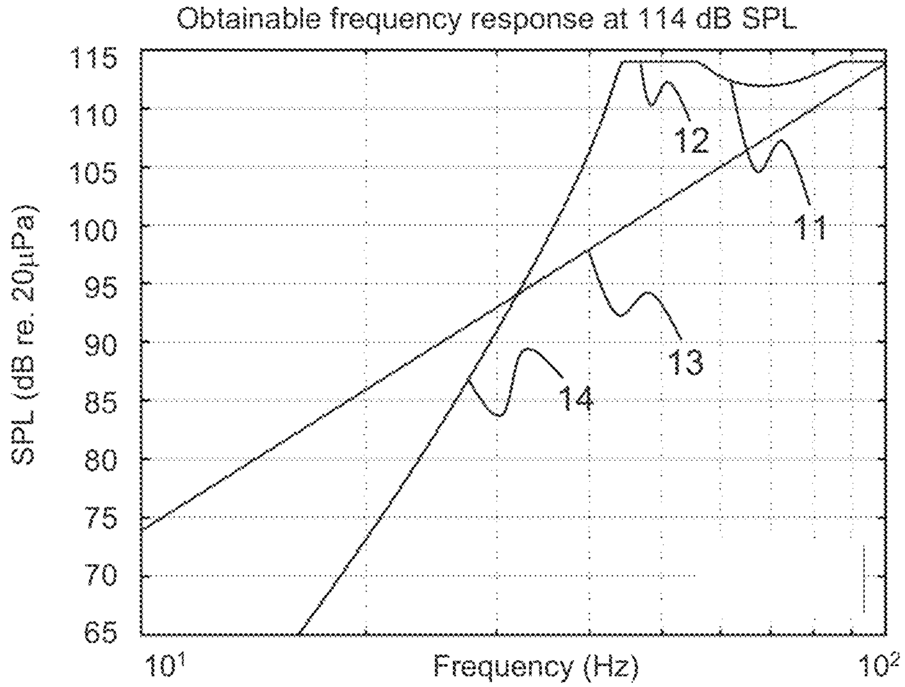
FIG. 4 shows a plot of an obtainable frequency responses at a sound pressure level of 114 dB SPL for a loudspeaker driver mounted in a closed box and a ported box, respectively.

With reference to FIG. 4 there is shown a plot of an obtainable frequency response at a sound pressure level of 114 dB SPL for a loudspeaker driver mounted in a closed box 13 and a ported box 14, respectively. And with a driver diaphragm excursion limit of 6 mm.

Figure 5:
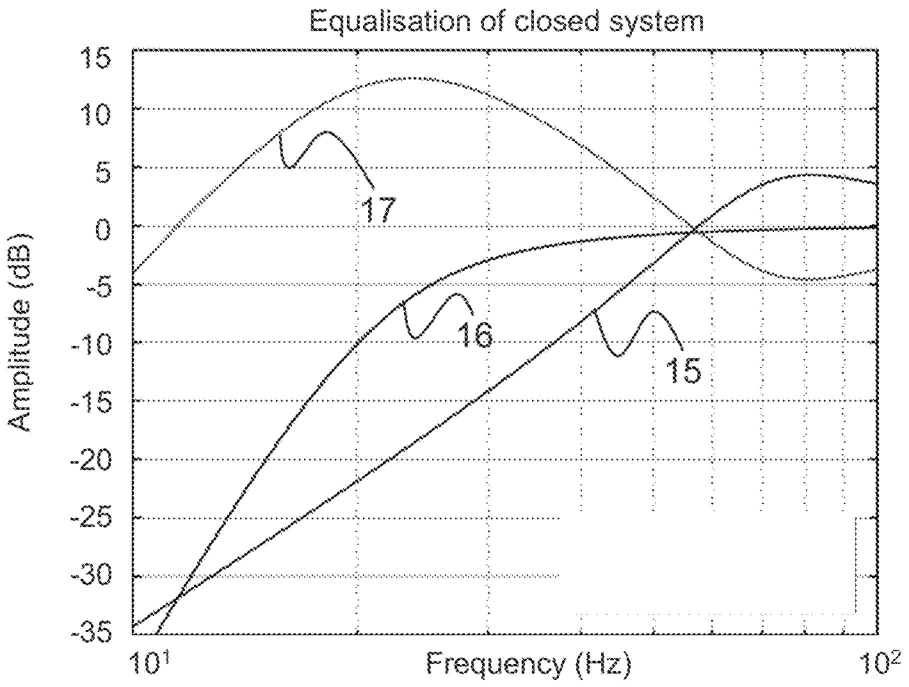
FIG. 5 shows acoustic the response of the loudspeaker driver mounted in the closed box with and without equalization and the corresponding equalizer frequency response.

With reference to FIG. 5 there is shown acoustic response of the loudspeaker driver mounted in the closed box with 16 and without 15 equalization and the corresponding equalizer frequency response 17.

Figure 6:
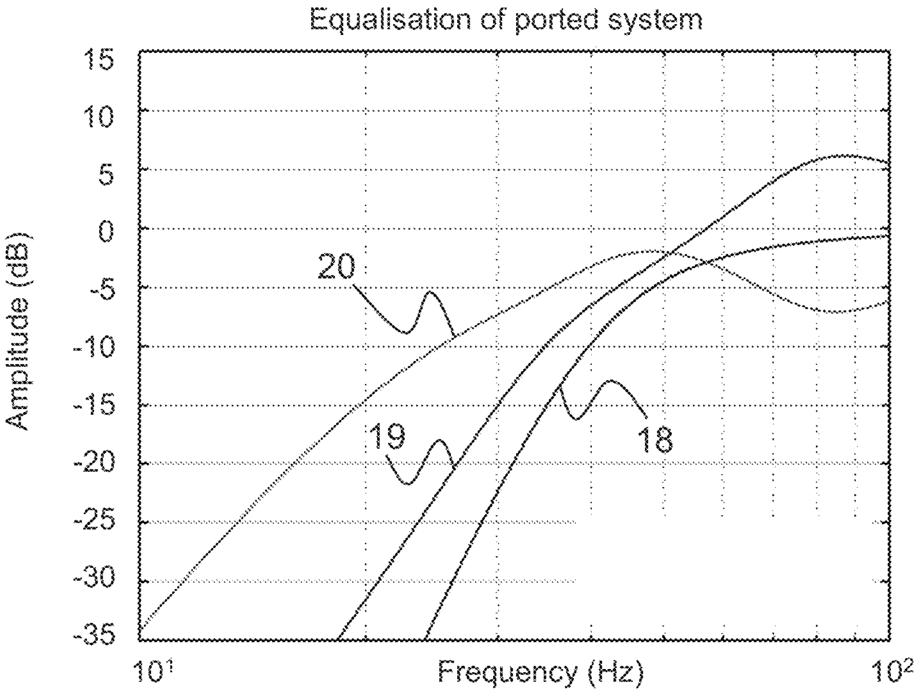
FIG. 6 shows the acoustic response of the loudspeaker driver mounted in the ported box with and without equalization and the corresponding equalizer frequency response.

With reference to FIG. 6 there is shown acoustic response of the loudspeaker driver mounted in the ported box with 18 and without 19 equalization and the corresponding equalizer frequency response 20.

Figure 7:
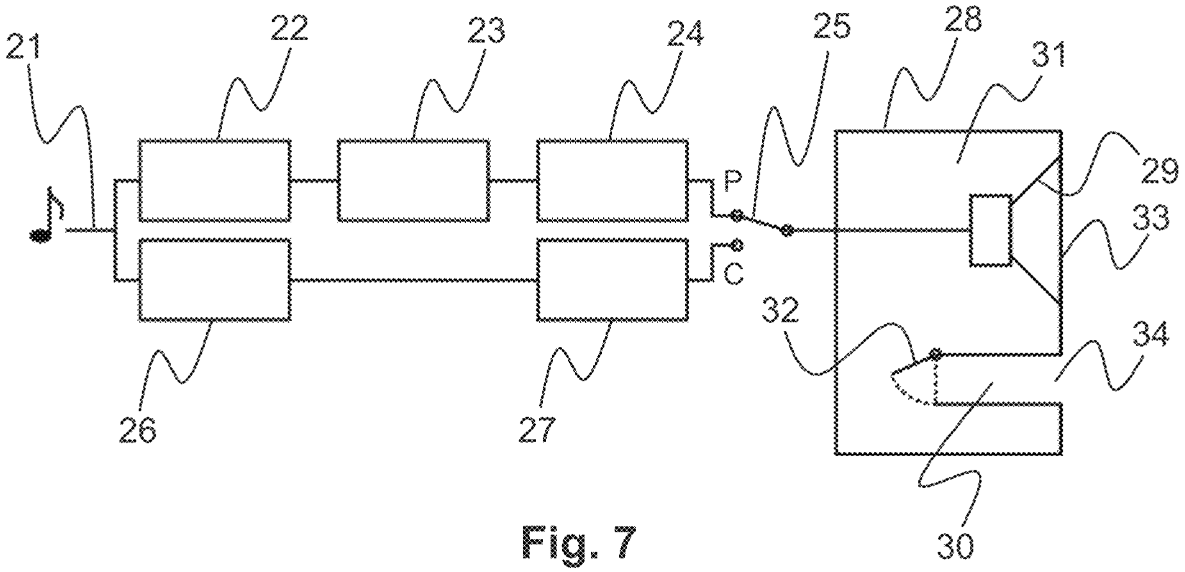
FIG. 7 shows a schematic block diagram illustrating signal processing required in order to take account of the state of the box, i.e. whether it is closed or ported.

With reference to FIG. 7 there is shown a schematic block diagram illustrating signal processing required in order to take account of the state of the enclosure 28, i.e. whether the port 30, 34 is closed or open as schematically illustrated by the closing means 32. In order to accommodate the acoustic system, the acoustic change of the system should be accompanied by a change in the signal processing feeding the amplifier of the driver. The signal processing change will be comprised by different equalizations and protection limiter settings.

The signal processing comprises first and second equalizers 22, 26 that receive an input signal 21 and which are configured to provide low frequency equalization. These equalizers 22 and 26 are linear filters which equalize the low frequency response to obtain the desired low frequency roll off. The desired low frequency roll-off is different depending on whether the enclosure is closed or ported. If the port is open (a ported enclosure), the switch 25 is in position P as shown in FIG. 7, whereas if the port is closed (a closed enclosure), the switch 25 is in position C. The port velocity limiter 23 is only present in the signal processing path in the case where the enclosure is ported and limits the air velocity in the port in order to keep port noise at a minimum. The displacement limiters 24, 27 limit the excursion of the loudspeaker diaphragm 29 to avoid damage to the diaphragm, its suspension and the loudspeaker driver and jarring sounds from the loudspeaker.

In an embodiment, the limiters 23, 24, 27 are implemented by level adjustments, which are controlled by the input level at 21. Thereby the limiters 23, 24, 27 are designed such that the level of the signal provided to the loudspeaker driver will be proportional to the level of the input signal at 21 until a threshold value is reached. Above this threshold value the level of the signal provided to the loudspeaker driver is maintained substantially constant even if the level of the input signal increases, for instance by the provision of suitable AGC or compressor means.

The following figures show various embodiments of the channel entity, i.e. the sound channel leading from the interior space of the loudspeaker enclosure via the port opening to the surroundings and the opening/closing mechanism provided in the channel. Throughout, sound entrance from the interior space of the enclosure to the channel entity is indicated by an arrow designated "In" and sound exit from the port opening is indicated by an arrow designated "Out".

Figure 8:
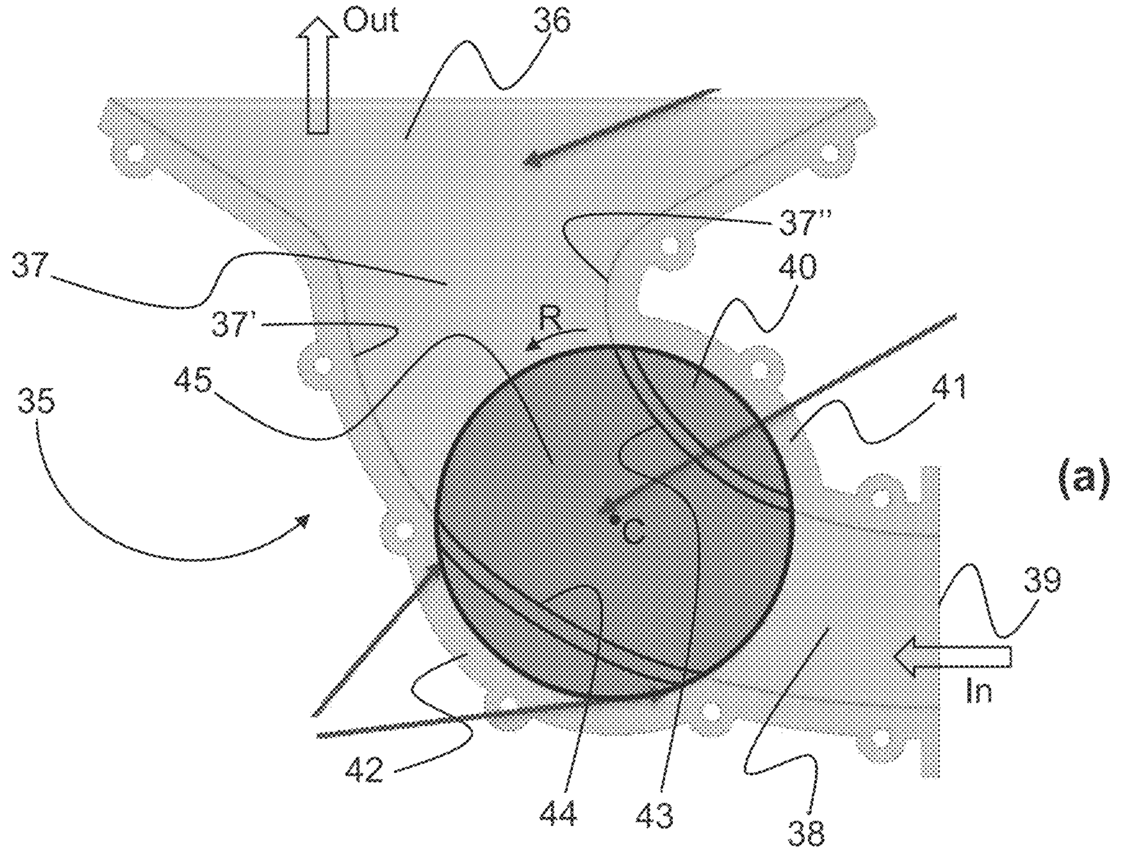
FIGS. 8(*a*) and (*b*) show a schematic representation of an embodiment of an opening/closing mechanism for application in an embodiment of the present invention.
Figure 8:
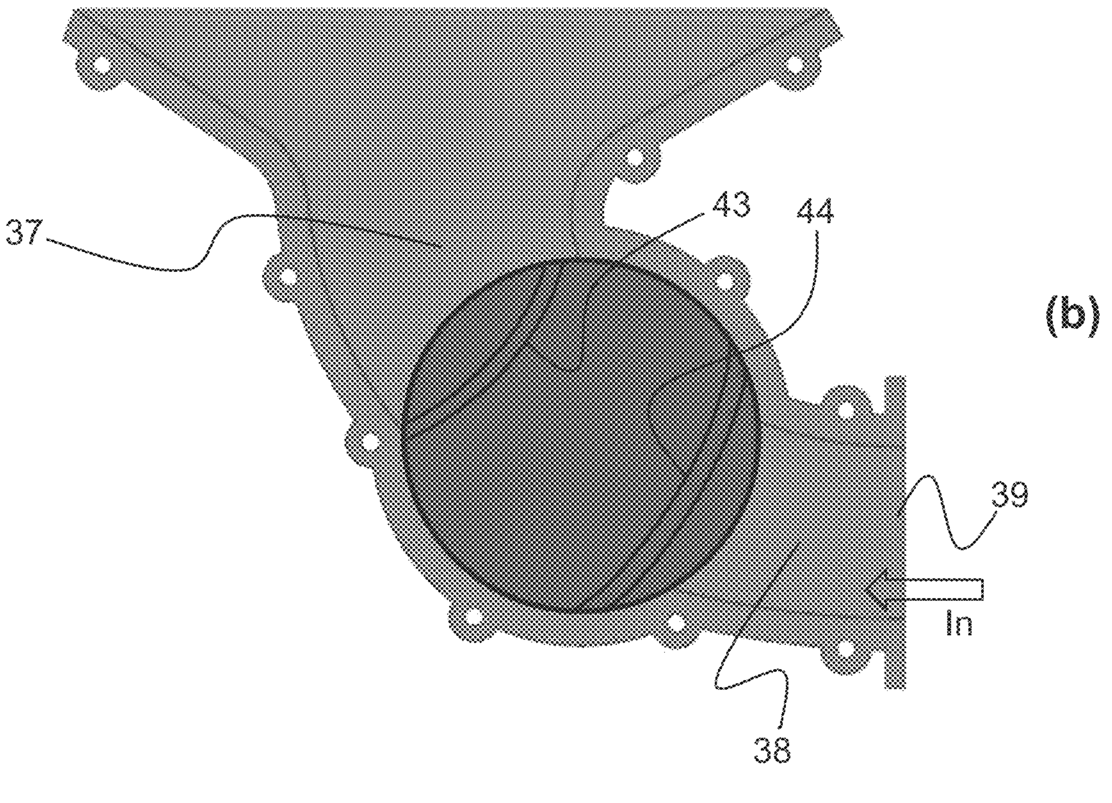

With reference to FIGS. 8(*a*) and (*b*) there is shown a schematic representation of an embodiment of an opening/closing mechanism 35 for application in an embodiment of the present invention. The port region of the channel leading from the interior of the enclosure to the surroundings is designated by 36 and the entrance to the channel from the interior of the enclosure is designated by 39. In the channel 37 there is provided an opening/closing mechanism formed as a cylindrical body 40 mounted for rotation about the longitudinal axis C of the cylindrical body 40. Through the cylindrical body 40 there extends a channel portion 45 bounded by wall portions 43 and 44 that in the shown embodiment provides a continuation of the interior wall portions 37" and 37', respectively of the channel 36. The curvatures of the interior surface of the body portion 41 and the interior surface of body portion 42, respectively correspond to the outer circumferential surface of the cylindrical body 40, whereby the cylindrical body 40 can rotate (as indicated by arrow R) within these body portions of the channel 37.

When the cylindrical body 40 is rotated as indicated by arrow R, it is brought to the state shown in FIG. 8(*b*) in which it tightly closes the channel 37.

Figure 9:
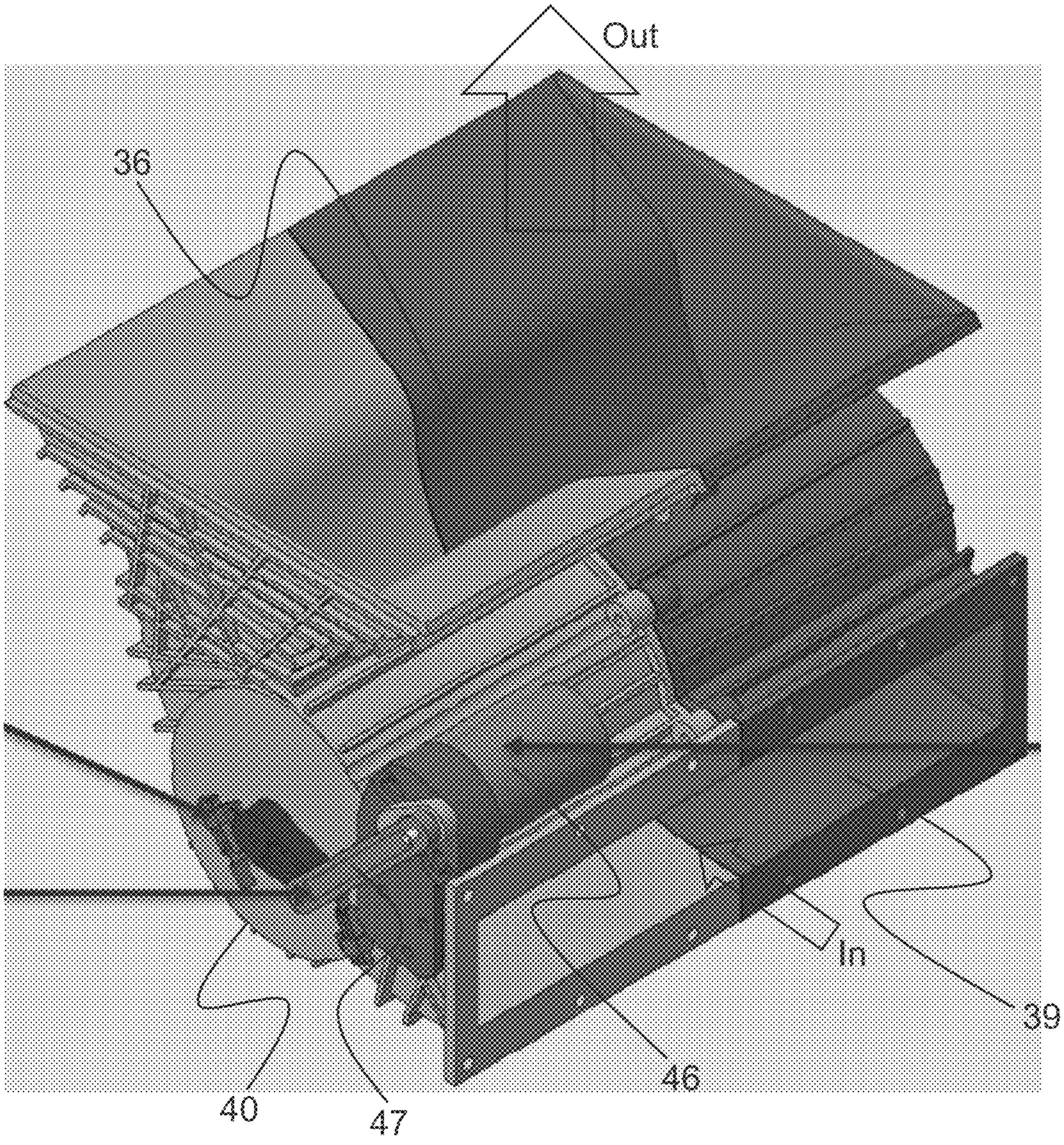
FIG. 9 shows a schematic representation of a first implementation of the opening/closing mechanism shown in FIGS. 8(*a*) and (*b*)

With reference to FIG. 9 there is shown a schematic representation of a practical implementation of a port channel unit comprising the opening/closing mechanism illustrated in FIGS. 8(*a*) and (*b*). FIG. 9 shows the port region 36 of the channel and the entrance region 39 connecting the channel with the interior space of the enclosure. The cylindrical body 40 is rotated by means of an actuator or motor 46 via a transmission 47.

Figure 10:
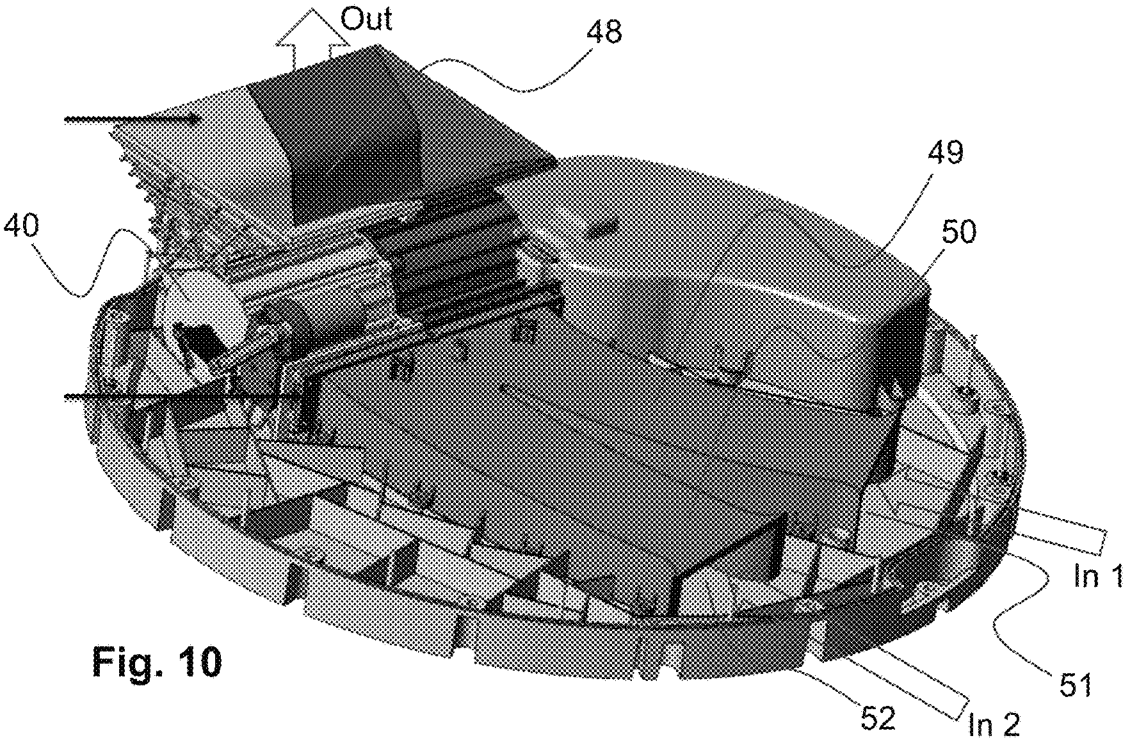
FIG. 10 shows a schematic representation of a dual channel embodiment of the invention comprising two separate channel portions that are both in acoustic communication with a common port region, wherein the opening/closing mechanism illustrated in FIGS. 8(*a*), 8(*b*) and 9 are used.

With reference to FIG. 10 there is shown a schematic representation of a dual channel embodiment of the invention comprising two separate channel portions 49, 50 with sound inlets 51 and 52, respectively configured to be in acoustic communication with the interior space of the loudspeaker enclosure. The two channel portions 49, 50 coincide to the port tuning and are both in acoustic communication with a common port region 48 (alternatively designated by reference numeral 36 in FIG. 9), wherein the opening/closing mechanism illustrated in FIGS. 8(*a*), 8(*b*) and 9 is inserted between the channels 49, 50 and the common port region 48 (36).

Figure 11:
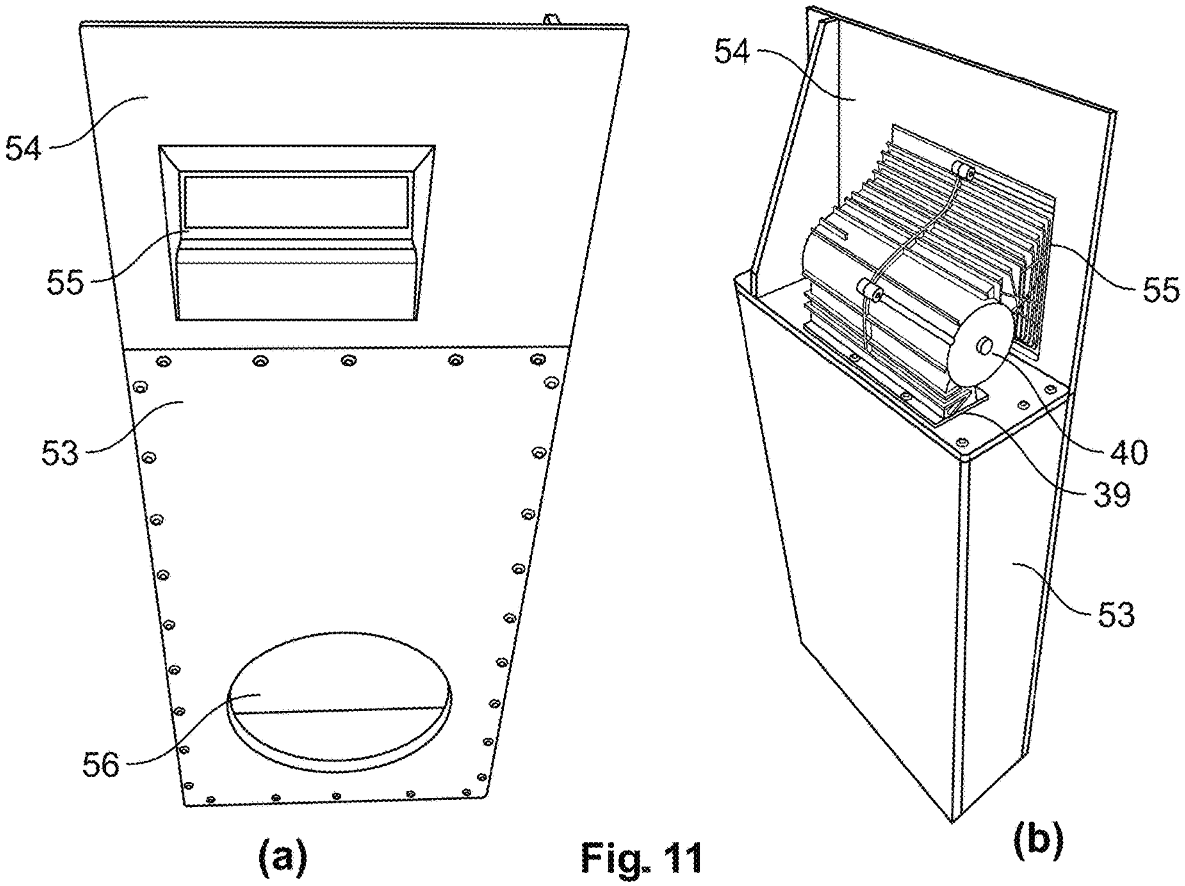
FIGS. 11(*a*) and (*b*) show schematic representations of the first implementation of the opening/closing mechanism mounted in a loudspeaker enclosure.

With reference to FIGS. 11(*a*) and (*b*) there are shown images of the port channel entity shown in FIG. 9 comprising the sound inlet portion 39, the port region 55 (alternatively designated by reference numerals 36 and 48 in FIGS. 8 and 9, respectively), and the cylindrical body 40 of the opening/closing mechanism illustrated in FIGS. 8(*a*) and 8(*b*) mounted in a loudspeaker enclosure 53 with an internal space with which the sound inlet portion 39 is in acoustic communication. The opening of the port region 55 (36, 48) is provided in an extension 54 to the loudspeaker enclosure 53 in which the opening 56 for the loudspeaker driver is provided.

Figure 12:
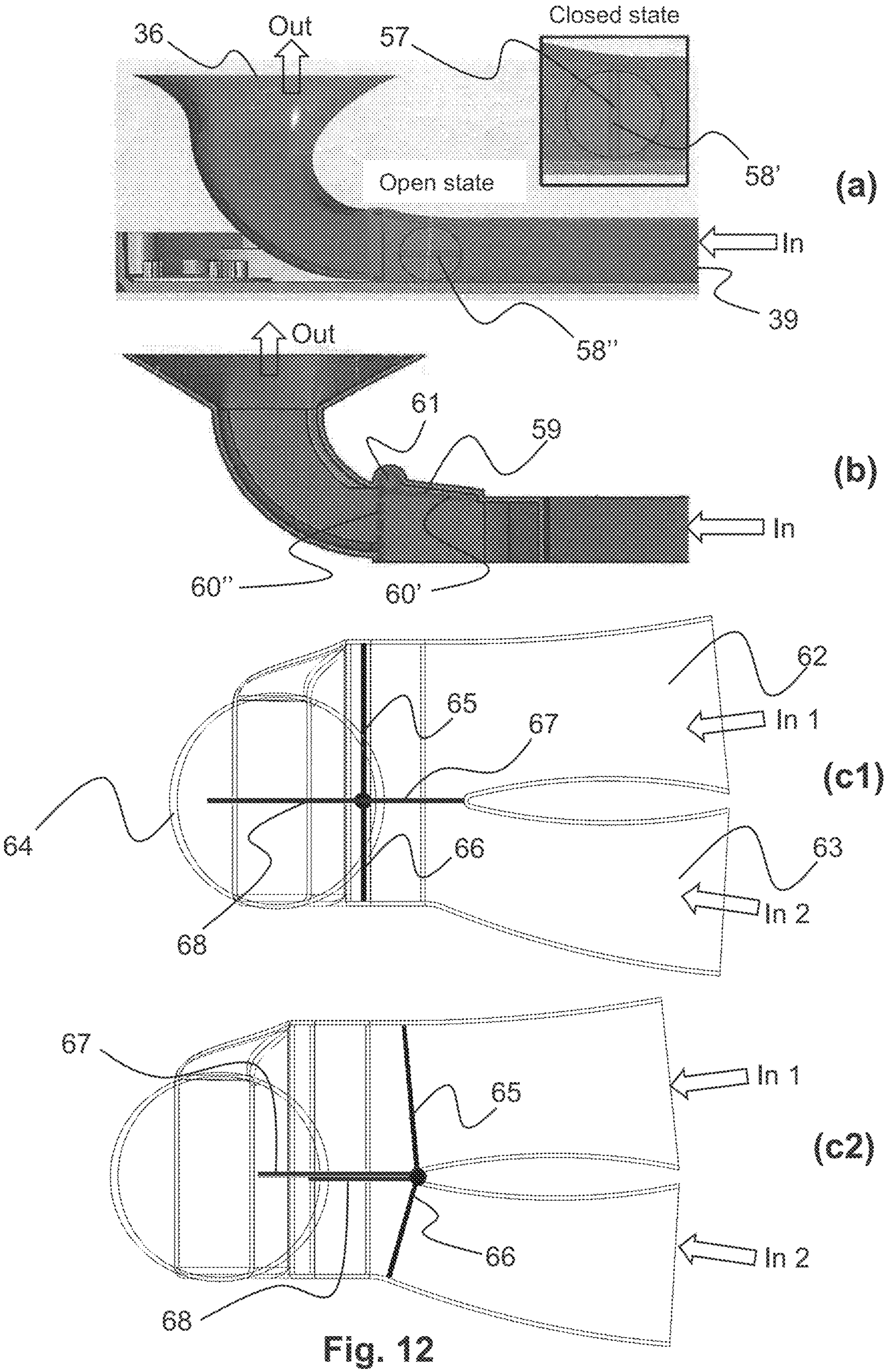
FIG. 12(*a*) through (*e*) show schematic representations of different implementations of opening/closing mechanisms for application in embodiments of the present invention.
Figure 12:
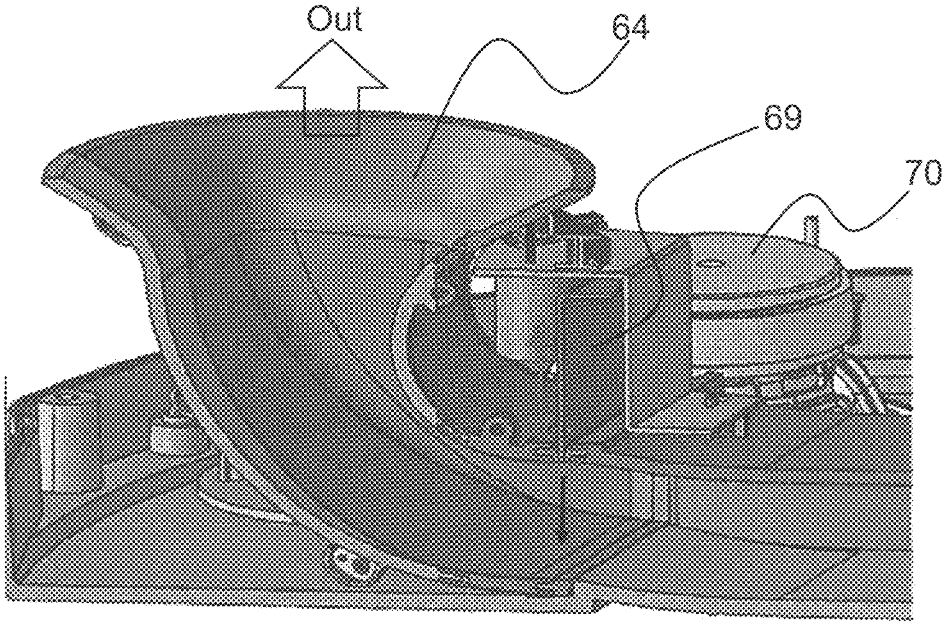
Figure 12:
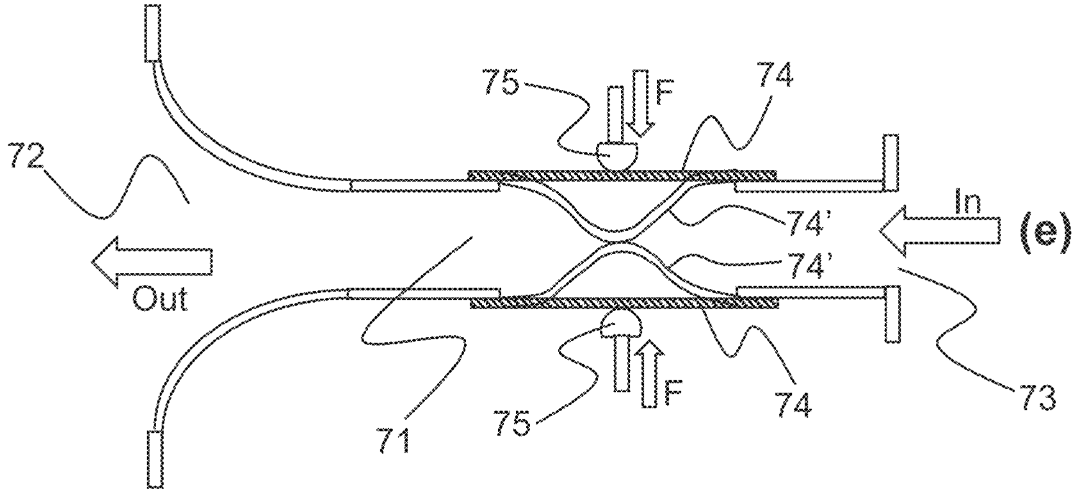

With reference to FIG. 12(*a*) through (*e*) there are shown schematic representations of alternative implementations of opening/closing mechanisms for application in embodiments of the present invention.

FIG. 12(*a*) illustrates a first alternative opening/closing mechanism provided in a sound channel with a sound inlet 39 and a sound outlet (port region) 36. The opening/closing mechanism comprises a rotatable plate member 57, the length of which is chosen such that it blocks sound passage through the channel in the closed state as indicated by reference numeral 58' and opens the sound channel in the open state as indicated by 58". The rotatable plate member 57 is coupled to a controllable actuator (not shown in the figure).

FIG. 12(*b*) illustrates a second alternative opening/closing mechanism comprising a plate member 59 connected to a wall portion of the channel by a hinge member 61 such that the plate member can rotate about the hinge member 61 between an open state indicated by 60' and a closed state indicated by 60".

FIGS. 12(*c*1 and *c*2) illustrates two different configurations of a third alternative opening/closing mechanism designed to be provided in a dual channel embodiment of the invention.

With reference to FIG. 12(*c*1) there is shown a schematic representation of the channel and port seen from above (as opposed to the embodiments shown in FIGS. 12(*a*) and 12(*b*) in which the channel and port are seen from the side). The port region (corresponding to 36 in FIG. 12(*a*)) is designated by 64 and two branches 62, 63 of the channel are leading from the enclosure to the port 64 via the opening/closing mechanism 65, 66, 67, 68.

Two blocking members 65 and 66, respectively are mounted for rotation about an axle, such that they can be brought from the closed position (65, 66) to the open position as indicated by 68 and 67, respectively, in which position the two members 65 and 66 extend in opposite directions as shown in the figure.

With reference to FIG. 12(*c*2) there is shown a schematic representation of the channel and port seen from above (as opposed to the embodiments shown in FIGS. 12(*a*) and 12(*b*) in which the channel and port are seen from the side). The port region (corresponding to 36 in FIG. 12(*a*)) is designated by 64 and two branches 62, 63 of the channel are leading from the enclosure to the port 64 via the opening/closing mechanism 65, 66, 67, 68.

Two blocking members 65 and 66, respectively are mounted for rotation about an axle, such that they can be brought from the closed position (65, 66) to the open position as indicated by 67 and 68, respectively, in which position the two members 65 and 66 extend parallel to each other as shown in the figure.

FIG. 12(*d*) illustrates a fourth alternative opening/closing mechanism in which a plate member 69 is mounted for introduction into the channel portion in a direction substantially perpendicular to the sound channel. The plate member 69 is operated by a controllable activator 70.

FIG. 12(*e*) illustrates a fifth alternative opening/closing mechanism inserted as an integral part of the sound channel 71 between the sound inlet 73 and the sound outlet (port region) 72. The opening/closing member comprises a flexible tubular member 74 forming a tight seal with the respective channel portions and being dimensioned such that a closing mechanism 75 can bring the flexible tubular member from a state in which its diameter is substantially equal to the diameter of the sound channel at the portion hereof, in which the flexible tubular member 74 is provided to a state in which the flexible tubular member closes the passage through the channel as indicated by 74' in the figure.

In all of the described embodiments of opening/closing mechanisms—as well as in any other opening/closing mechanisms that should be used in the present invention, it is important that a tight blockage of the sound channel is provided in the closed state and the respective opening/closing mechanisms may therefore be provided with suitable means, such as this rubber strips, to ensure that a sufficiently tight seal is indeed achieved in the closed state.

Although the invention has been explained in relation to the embodiments described above, it is to be understood that many other possible modifications and variations can be made without departing from the scope of the present invention.

The invention claimed is:

1. A loudspeaker device comprising:

a loudspeaker unit comprising a diaphragm with a first and second surface and an enclosure in which the loudspeaker unit is mounted such that the first surface of the diaphragm is in acoustic communication with surroundings of the loudspeaker device; and an internal cavity formed in the enclosure and being in acoustic communication with the surroundings of the loudspeaker device via an acoustic element;

wherein the second surface of the diaphragm is in acoustic communication with the internal cavity;

wherein the acoustic element is configured to be changed between an open state in which the acoustic element permits sound energy generated by the loudspeaker unit in the internal cavity to be emitted to the surroundings via the acoustic element and a closed state in which the acoustic element substantially prevents sound energy from entering the surroundings via the acoustic element, wherein the acoustic element is configured to be changed between the open state and the closed state based on a threshold value of a sound pressure level that defines whether the acoustic element is to block or open acoustic communication from the internal cavity to the surroundings, wherein the threshold value is based on a diaphragm excursion limit of the loudspeaker unit such that when the sound pressure level generated by the loudspeaker device is above the threshold value, the acoustic element is configured to be in the open state to prevent non-linear distortion of an acoustic output of the loudspeaker device, and when the sound pressure level generated by the loudspeaker device is below the threshold value, the acoustic element is configured to be in the closed state.

2. A loudspeaker device according to claim 1, wherein the loudspeaker device comprises amplifier means configured to drive the loudspeaker unit and provided with a volume control by which the acoustic output of the loudspeaker device can be varied by a user, and wherein adjustment of said volume control controls the acoustic element such that the volume control controls whether the acoustic element is in the open state or the closed state.

3. A loudspeaker device according to claim 2, wherein adjustment of said volume control controls activation and de-activation of sound emission to the surroundings via said acoustic element, wherein the control of activation or de-activation takes place with hysteresis, such that when the setting of the volume control is increased to a setting S2, the acoustic element opens and when the volume control is reduced to a setting S1 below S2, the acoustic element closes.

4. A loudspeaker device according to claim 2, wherein adjustment of said volume control controls activation and de-activation of sound emission to the surroundings via said acoustic element, wherein the control of activation or de-activation takes place without hysteresis, such that when the setting of the volume control is increased above a setting S3, the acoustic element opens and when the volume control is reduced below the setting S3, the acoustic element closes.

5. A loudspeaker device according to claim 1, wherein said acoustic element is a channel provided with blocking means configured to block acoustic communication through the channel when the loudspeaker device is in the closed state in which sound energy is substantially prevented from entering the surroundings via the acoustic element.

6. A loudspeaker device according to claim 1, wherein variation of the acoustic element is controlled by a user interface.

7. A loudspeaker device according to claim 1, wherein said internal cavity and said acoustic element forms a Helmholtz resonator, whereby the loudspeaker device, in the open state of the acoustic element, functions as a bass reflex loudspeaker.

8. A loudspeaker device according to claim 1, wherein said acoustic element is a passive sound radiator.

9. A loudspeaker device according to claim 8, further comprising blocking means configured to substantially prevent the diaphragm from undergoing displacements to prevent the passive sound radiator from emitting sound energy to the surroundings.

10. A loudspeaker device according to claim 5, wherein the loudspeaker device comprises more than one channel which can be blocked individually to obtain different channel tunings, whereby it is possible to cover different frequency ranges and/or different volume ranges and thereby increasing a number of ways in which a frequency response and maximum power output can be varied.

11. A loudspeaker device according to claim 5, wherein the channel has a variable length, whereby the tuning of the channel can be steplessly changed.

12. A loudspeaker device according to claim 11, wherein the channel comprises two or more tubes provided slideably inside each other.

13. A loudspeaker device according to claim 1, wherein a state of the acoustic element is dependent on user profiles and/or music styles.

14. A loudspeaker device according to claim 1, wherein a state of the acoustic element is obtained automatically based on detection of music by a suitable digital signal processor (DSP) or in connection with a change of signal source.

15. A loudspeaker device according to claim 1, wherein the loudspeaker device is provided with digital signal processing (DSP) filter means that interacts with a state of the acoustic element, whereby different filter adjustments can be applied to a input signal to the loudspeaker device dependent on the state of the acoustic element.

16. A method for improving sound quality especially at low frequencies of a loudspeaker device, which method comprises:

providing a loudspeaker device comprising a loudspeaker unit having a diaphragm with a first surface and a second surface, wherein the loudspeaker unit is mounted in an enclosure having an internal cavity such that the first surface of the diaphragm radiates sound energy into surroundings of the enclosure and the second surface of the diaphragm radiates sound energy into the internal cavity of the enclosure, and wherein the internal cavity is acoustically connected to an opening in the enclosure such that sound energy can enter the surroundings of the enclosure through the opening, wherein the acoustic connection takes place through an acoustic element in which the acoustic element is configured such that the acoustic element can block or open the acoustic connection from the internal cavity to the surroundings;

providing activating means configured to block or open said acoustic connection from the internal cavity to the surroundings;

setting a threshold value based on a diaphragm excursion limit of the loudspeaker unit that defines whether the activating means shall block or open the acoustic connection from the internal cavity to the surroundings;

providing means for determining if said threshold value is exceeded;

if the threshold value is not exceeded, placing the acoustic connection in a blocked state; and if the threshold value is exceeded, placing the acoustic connection in an open state to prevent non-linear distortion of an acoustic output of the loudspeaker device.

17. A method according to claim 16, wherein said threshold value is related to the setting of a volume control that controls a sound volume determined by a sound pressure level (SPL) produced by the loudspeaker device or a loudness produced by the loudspeaker device such that the enclosure acts as a closed box at a low SPL or a low loudness and such that the enclosure acts as an open box at a high SPL or a high loudness of the sound produced in the surroundings of the enclosure by the loudspeaker device.

18. A method according to claim 17, wherein adjustment of said volume control controls activation and de-activation of sound emission to the surroundings via said acoustic element, wherein the control of activation or de-activation takes place with hysteresis, such that when the setting of the volume control is increased to a setting S2, the acoustic element opens and when the volume control is reduced to a setting S1 below S2, the acoustic element closes.

19. A method according to claim 17, wherein adjustment of said volume control controls activation and de-activation of sound emission to the surroundings via said acoustic element, wherein the control of activation or de-activation takes place without hysteresis, such that when the setting of the volume control is increased above a setting S3, the acoustic element opens and when the volume control is reduced below the setting S3, the acoustic element closes.

* * * * *